June 18, 1940.   H. E. EDGERTON   2,205,246
SYNCHRONOUS-MOTOR-CONTROL SYSTEM
Filed June 12, 1933
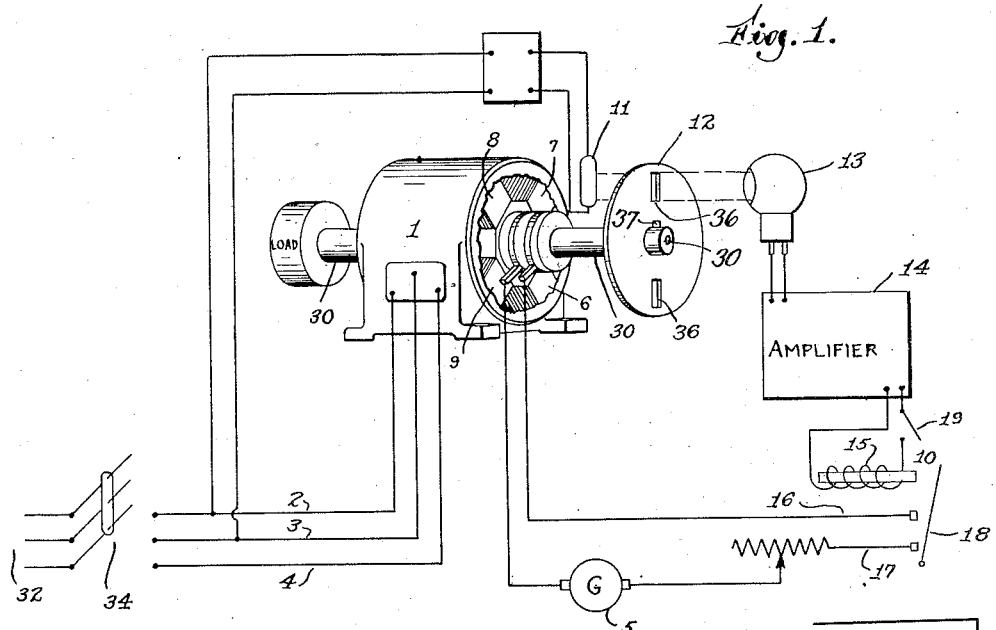
Fig. 1.
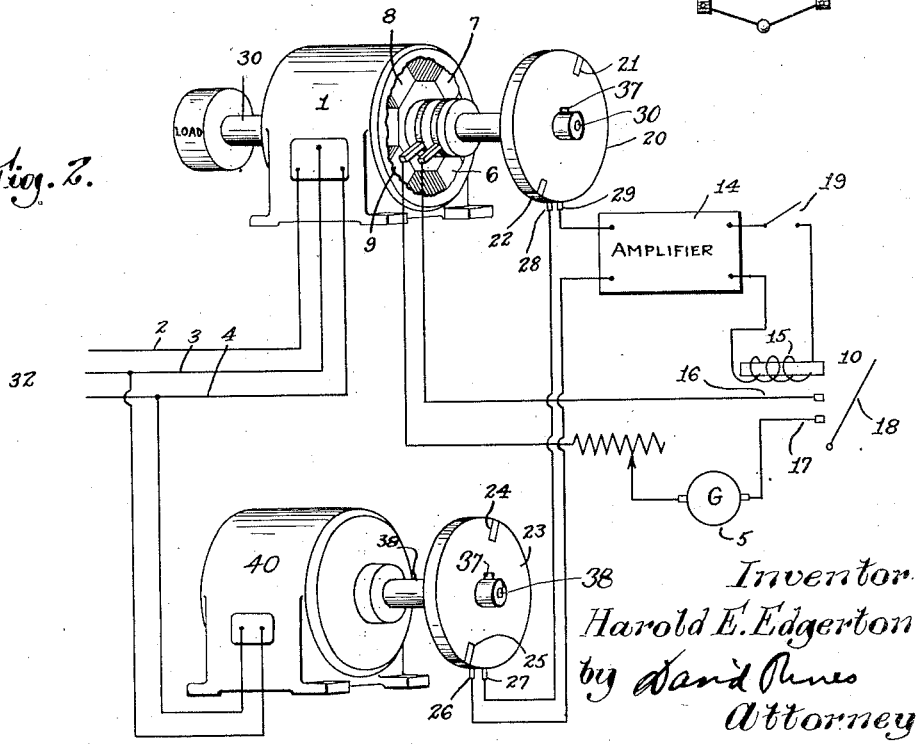
Fig. 2.
Fig. 3.
Inventor
Harold E. Edgerton
by David Rines
Attorney Patented June 18, 1940

2,205,246

UNITED STATES PATENT OFFICE 2,205,246

SYNCHRONOUS-MOTOR-CONTROL SYSTEM

Harold Eugene Edgerton, Watertown, Mass., assignor to Westinghouse Electric & Manufacturing Company, East Pittsburgh, Pa., a corporation of Pennsylvania Application June 12, 1933, Serial No. 675,348

13 Claims. (Cl. 171—118)

The present invention relates to synchronous-motor-control systems.

It is well known that synchronous motors, after being started as induction motors, are capable of synchronizing with a larger load if the field switch is closed to connect a field winding to a source of exciting current at certain angles. The angle referred to is the angle in electrical degrees which exists between the axis of a physical field pole and an imaginary field pole that would generate the terminal voltage on open circuit. This angle is also equal to the angle between the axis of a physical field pole and the axis of a pole of the flux produced by the armature.

An object of the present invention, therefore, is to provide a new and improved, synchronous-motor-starting system with the use of which it shall be possible to connect the field circuit of a synchronous motor to a source of exciting current at the most favorable angle.

Other and further objects will be described hereinafter.

The invention will now be described in connection with the accompanying drawing, in which Fig. 1 is a diagrammatic view of circuits and apparatus constructed and arranged according to one embodiment of the present invention; Fig. 2 is a similar view of a modification; and Fig. 3 is a diagrammatic view of a centrifugal switch used in the circuits.

A synchronous motor 1 is shown having the usual rotor construction whereby the field poles 6, 7, 8 and 9 rotate. The stator or armature is connected by a plurality of wire conductors 2, 3 and 4 to an alternating-current supply of power 32 by means of a switch 34. The motor 1 is brought up to speed when these wires are energized upon the closing of the switch 34. Usually this is done through a step-down auto-transformer in order to reduce the current taken by the motor. Polyphase power from the lines causes the armature to produce a rotating magnetic field in the motor which gives an induction motor torque to the rotor for starting. The rotor speeds up and finally reaches a speed which depends upon the amount of load on the shaft. This rotor speed, which is slightly below synchronous, is slightly less than that of the rotating magnetic field.

Direct current from any source, such as a generator 5, when connected by wire conductors 16 and 17 to the windings on field poles 6, 7, 8, 9 by a field switch or relay 10, causes the field widings to produce a magnetic field. The rotor poles 6, 7, 8 and 9 are either attracted or repulsed by the magnetic poles that are caused by the polyphase alternating voltage on the stator, depending upon the relative angular position.

If the field switch 10 is closed at such an angle that there is a force between the rotor and the stator poles tending to accelerate the rotor, then the rotating part is speeded up in such a direction as to raise the speed of the motor to synchronism. If the switch is closed at such an angle that there is a force tending to decelerate the rotor, then the rotating part is slowed down, which retards synchronism. Should the load be small enough, the motor may ultimately synchronize even if the field switch 10 is closed under the worst possible conditions. If the switching is "angularly controlled", however, the motor is able to pull a larger load up to synchronous speed.

A stroboscopic lamp 11 is shown, in Fig. 1, connected to the two conductors 2 and 3, in order that the frequency and the phase relationship of the stroboscopic light may be the same as that of the voltage of the power source 32 from which the motor 1 is driven. The stroboscopic-light flashes are thus accurately timed at the same relative position of each cycle. Such light is thus useful for studying and controlling the synchronous motor 1, as will now be explained.

The rotating parts of a synchronous motor, at synchronous speed, when illuminated by means of the stroboscopic lamp 11, appear in a stationary position. The poles appear to be standing still, although they are rotating rapidly, because the flashes of light are exactly timed with respect to the alternating voltage, the source 32 of which, as before stated, is connected with the motor. These poles will appear to drop back in phase, if viewed with synchronous stroboscopic light, as load is applied to the shaft 30 of the motor. At some maximum load, the rotor will "pull out of step" and will appear to rotate backwards at a relatively slow speed, or it may stop altogether, depending upon the characteristics of the motor.

According to a feature of the present invention, this stroboscopic phenomenon is utilized to cause the field circuit of synchronous motors to be connected to a source of exciting current at the most favorable angle. A disc 12 is preferably attached rigidly to the shaft 30 of the synchronous motor 1 by a set screw 37. A radial slit 36 is cut in this disc for every pair of poles on the rotor of the motor. The slits are spaced to correspond with the pairs of poles of the rotor. One slit can be used but it will not give as many signals. The stroboscopic light source 11 is disposed on one side of the disc 12 and a light sensitive device 13 is disposed on the other side so that the light falls upon it. An amplifier 14, controlled by impulses from the light-sensitive device 13, energizes a coil 15 for actuating the movable member 18 of the field switch 10, thus connecting the field circuit through the wires 16 and 17 to the generator 5 which provides the exciting current. A switch 19, for closing the circuit of the coil 15, is not closed until the motor is essentially up to speed due to the induction-motor effect. The switch 18 may be either operated manually or by a relay connected to operate as a function of speed, time, or any other factor. In Fig. 3, the switch 18 is shown diagrammatically as a centrifugal switch which may be driven by the motor shaft 30.

Provision may be easily made for automatically turning off the stroboscope and the amplifier after the motor has synchronized properly, but this is not illustrated herein, since such devices are well known in the art.

The most favorable angle has been found to be the one at which the stroboscope flashes when the slit 36 is in the position shown in Fig. 1, so that the light can fall on the light-sensitive device 13, the motor running at no load. An easy method to adjust the stroboscopic angularly-controlled relay, therefore, is to observe the position of the radial slits 36 in the disc 12 while running the motor at no load.

Since the field circuit is inductive, a time lag is required, for the field current to build up. This lag makes it advisable to adjust the stroboscope light 11 and the light-sensitive device 13 so that they close the relay 10 a little before the angle reaches the no-load value. The apparatus may be adjusted to close the relay 10 at any predetermined angle.

Though the fields of the synchronous motors are shown and described as rotating, it will be understood that the invention is equally applicable to synchronous motors in which the armature rotates.

The field-closing relay 10 may be angularly controlled otherwise than is illustrated in Fig. 1 and, in particular, as illustrated in Fig. 2. The synchronous motor 1 which is to be synchronized drives a commutating disc 20 of insulating material that has metallic, segmental inserts, one for each pair of poles. The inserts are spaced to correspond with the pairs of poles of the rotor. One segment can be used but it will not give as many signals. As the motor 1 is shown provided with four poles, two inserts 21 and 22 are illustrated. Two brushes 28 and 29 contact with the segments 21 and 22 as the motor rotates. The brushes 28 and 29 are in contact with the segments 21 and 22 when the rotor of the motor 1 has a predetermined angular relation.

A small synchronous motor 40, running at no load, is connected, like the stroboscope 11, to the polyphase supply of power 32. To the shaft 38 of the motor 40 is connected a commutating, insulated disc 23, provided with metallic segmental inserts 24 and 25, also spaced to correspond to the pairs of poles of the rotor, against which discs contact brushes 26 and 27 make contact. One insert is provided for each pair of poles. One segment can be used but it will not give as many signals. The brushes 26 and 27 are in contact with the segments 24 and 25 when the rotor of the motor 40, and therefore the power supply 32, has a predetermined angular relation.

The brushes 28, 29 and 26, 27 are connected in series with the amplifier 14 which, in turn, controls the field-closing switch 10 in the same manner as before described. It is not, however, necessary to use an amplifier, if the field-circuit-closing relay 10 is of a type which operates upon small pulses of current, such as will be produced when the brushes make contact.

An electrical connection through the two sets of brushes 28, 29 and 26, 27 occurs only when the rotors of the motors 1 and 40 occupy some particular angular position. Once this angle is properly adjusted in any desired way, as by either changing the position of the commutators on the shafts 30 and 38, or by shifting the angular position of either set of brushes, the field will be connected to the generator 5 when the field has the desired angular relation to the flux produced by the armature. The small motor 40, since it runs at no-load will synchronize long before the motor 1 has obtained its balancing speed as an induction motor, and in consequence establishes a reference angle and, therefore, in conjunction with the operation of disc 20 angularly controls the moment of switching of the field current into the field circuit.

Further modifications will occur also to persons skilled in the art, and all such are considered to fall within the spirit and scope of the invention, as defined in the appended claims.

What is claimed is:

1. In an electric system comprising a synchronous motor having an armature and a field winding, a plurality of conductors for connecting the armature with an alternating-current supply of power, a relay for connecting the circuit of the field winding to a source of exciting current, and stroboscopic means for closing the relay at a predetermined angle between the armature flux and the field winding.

2. In an electric system comprising a synchronous motor having an armature and a field winding, a plurality of conductors for connecting the armature with an alternating-current supply of power, a relay for connecting the circuit of the field winding with a source of exciting current, and stroboscopic means connected in circuit with two of the conductors for closing the relay at a predetermined angle between the armature flux and the field winding.

3. In an electric system comprising a synchronous motor having two elements, namely, a stator and a rotor, one of the elements being an armature and the other element being a field winding, a plurality of conductors for connecting the armature with an alternating-current supply of power, a relay for connecting the circuit of the field winding with a source of exciting current, stroboscopic means connected in circuit with two of the conductors, a member having an opening and rotatable in synchronism with the rotor, a light-sensitive device to which light from the stroboscopic means is adapted to travel through the opening, and means controlled by the light-sensitive device for closing the relay.

4. In an electric system comprising a synchronous motor having two elements, namely, a stator and a rotor, one of the elements being an armature and the other element being a field winding, a plurality of conductors for connecting the armature with an alternating-current supply of power, a relay for connecting the circuit of the field winding with a source of exciting current, stroboscopic means connected in circuit with two of the conductors, a member rotatable with the rotor and having a plurality of openings equal in number to, and spaced to correspond with, the pairs of poles of the rotor, a light-sensitive device to which light from the stroboscopic means is adapted to travel through the openings, and means controlled by the light-sensitive device for closing the relay.

5. In an electric system comprising a synchronous motor having two elements, namely, a stator and a rotor, one of the elements being an armature and the other element being a field winding, a plurality of conductors for connecting the armature with a polyphase alternating-current supply of power, a relay for connecting the circuit of the field winding with a source of exciting current, stroboscopic means connected in circuit with two of the conductors, a member rotatable with and adjustable with respect to the rotor and having a plurality of openings equal in number to, and spaced to correspond with, the pairs of poles of the rotor, a light-sensitive device to which light from the stroboscopic means is adapted to travel through the openings, means controlled by the light-sensitive device for closing the relay.

6. In an electric system comprising a synchronous motor having an armature and a field winding, means for connecting the field winding of the motor to a source of exciting current, means driven by the motor, a source of stroboscopic light cooperating with the motor-driven means, a light-sensitive device illuminated by the light from the source when the field winding is at a predetermined angle with respect to the armature flux, and means controlled by the light-sensitive device for actuating the field-energizing means.

7. In an electric system comprising a synchronous motor having two elements, namely, a stator and a rotor, one of the elements being an armature and the other element being a field winding, a plurality of conductors for connecting the armature with an alternating-current supply of power, and a relay for connecting the circuit of the field winding to a source of exciting current, an insulating disc rotatable in synchronism with the rotor and having a plurality of conducting segments equal in number to, and spaced to correspond with, the pairs of poles of the rotor, two brushes for contacting with the conducting segments, a second synchronous motor connected in circuit with two of the conductors, a second insulating disc rotatable in synchronism with the second synchronous motor and also having a plurality of conducting segments equal in number to, and spaced to correspond with, the pairs of poles of the rotor, two brushes for contacting with the conducting segments of the second insulating disc, means connecting the four brushes into circuit, and means controlled by the circuit for closing the relay.

8. In an electric system comprising a synchronous motor having two elements, namely, a stator and a rotor, one of the elements being an armature and the other element being a field winding, a plurality of conductors for connecting the armature with an alternating-current supply of power, a relay for connecting the circuit of the field winding with a source of exciting current, an insulating disc rotatable in synchronism with the rotor and having a plurality of conducting segments equal in number to, and spaced to correspond with, the pairs of poles of the rotor, two brushes for contacting with the conducting segments, a second synchronous motor connected in circuit with two of the conductors, a second insulating disc rotatable in synchronism with the second synchronous motor and also having a plurality of conducting segments equal in number to, and spaced to correspond with, the pairs of poles of the rotor, two brushes for contacting with the conducting segments of the second insulating disc, means connecting the four brushes into circuit, and means controlled by the circuit for closing the relay, the insulating discs being adjustable relative to the brushes.

9. An electric system comprising a synchronous motor, having two elements, namely, a stator and a rotor, one of the elements being an armature and the other element being a field winding, a plurality of conductors for connecting the armature with an alternating-current supply, a switch closed at a predetermined phase angular relation of the alternating-current supply, a switch closed at a predetermined angular position of the rotor, and means dependent upon the simultaneous closure of said switches for connecting said field winding to a source of exciting current.

10. The method of pulling into synchronous speed a synchronous motor having two elements, namely, a stator and a rotor, one of the elements being an armature and the other element being a field winding, the motor having a member rotatable in synchronism with the rotor, the said method comprising illuminating the rotatable member of said motor in synchronism with the alternating-current supply, and connecting the field winding to a source of exciting current when the rotatable member appears to occupy a predetermined position by reason of the said synchronous illumination.

11. In an electric system comprising a synchronous motor having two elements, namely, a stator and a rotor, one of the elements being an armature and the other element being a field winding, means for connecting the armature with an alternating-current supply of power, a relay for connecting the circuit of the field winding to a source of exciting current, whereby the alternating voltage supplied to the armature from the alternating-current supply of power produces a magnetic field that rotates in space at a synchronous speed, and whereby the direct voltage applied to the field winding from the source of exciting current produces a second magnetic field which rotates at synchronous speed when the motor is operating at synchronous speed and which reacts upon the first-named magnetic field to produce a torque that is a function of the angle of displacement between the said magnetic fields, a member rotatable in synchronism with the rotor, and means dependent upon the phase relation of the alternating-current supply and cooperating with the rotatable member for closing the relay at a predetermined angle of displacement between the said magnetic fields.

12. In an electric system comprising a synchronous motor having an armature and a field winding, means connecting the armature with an alternating-current supply of power, a relay for connecting the circuit of the field winding to a source of exciting current, and stroboscopic means for closing the relay.

13. In an electric system comprising a synchronous motor having two elements, namely, a stator and a rotor, one of the elements being an armature and the other element being a field winding, means for connecting the armature to an alternating-current supply of power, a member rotatable in synchronism with the rotor, means for stroboscopically illuminating the rotatable member in synchronism with the alternating-current supply, and means for connecting the circuit of the field winding to a source of direct current, when the rotatable member appears to occupy a predetermined position as illuminated by the stroboscopic illuminating means.

HAROLD E. EDGERTON.

DISCLAIMER 2,205,246.—*Harold Eugene Edgerton*, Watertown, Mass. SYNCHRONOUS-MOTOR-CONTROL SYSTEM. Patent dated June 18, 1940. Disclaimer filed December 13, 1940, by the assignee, *Westinghouse Electric & Manufacturing Company;* the inventor concurring in and approving.

Hereby enters this disclaimer of claim 11 in said Letters Patent.

[*Official Gazette January 7, 1941.*]